United States Patent [19]

Stillwagon

[11] Patent Number: 5,141,355
[45] Date of Patent: * Aug. 25, 1992

[54] LOCK AND RELEASE APPARATUS

[75] Inventor: Woodrow C. Stillwagon, Fulton County, Ga.

[73] Assignee: Star Lock Systems, Inc., Columbus, Ohio

[*] Notice: The portion of the term of this patent subsequent to Feb. 13, 2007 has been disclaimed.

[21] Appl. No.: 716,053

[22] Filed: Jun. 17, 1991

Related U.S. Application Data

[63] Continuation of Ser. No. 425,016, Oct. 23, 1989, abandoned, which is a continuation of Ser. No. 327,250, Mar. 22, 1989, Pat. No. 4,900,182.

[51] Int. Cl.⁵ .............................................. F16B 7/00
[52] U.S. Cl. ..................................... 403/325; 403/359; 403/383; 403/322
[58] Field of Search .............. 403/325, 328, 383, 350, 403/351, 352, 359, 322, 321, 108, 105; 70/386; 411/348; 292/252

[56] References Cited

U.S. PATENT DOCUMENTS

| | | | |
|---|---|---|---|
| 951,836 | 3/1910 | Novack | 403/383 |
| 1,829,760 | 11/1931 | Santiago | 24/136 A |
| 2,062,628 | 12/1936 | Yannetta | 24/136 A |
| 2,514,760 | 7/1950 | Hansen et al. | 24/136 A |
| 3,089,330 | 5/1963 | Kerr | 70/140 |
| 3,122,012 | 2/1964 | Christopher | 70/140 |
| 3,186,196 | 6/1965 | Moberg | 70/34 |
| 3,240,519 | 3/1966 | Weasler | 403/325 |
| 3,260,541 | 7/1966 | Sadler et al. | 403/325 |
| 3,454,002 | 7/1969 | Westlake et al. | 403/351 X |
| 3,507,508 | 4/1970 | Andrews | 403/383 X |
| 3,525,242 | 8/1970 | Young | 20/231 |
| 3,659,444 | 5/1972 | Wellekens | |
| 3,738,134 | 6/1973 | Hall | 70/86 |
| 3,779,037 | 12/1973 | Petros et al. | 403/383 X |
| 4,132,092 | 1/1979 | Steinbach | 70/208 |
| 4,141,117 | 2/1979 | Van Gompel | 24/136 R |
| 4,165,195 | 8/1979 | Teramachi | 403/359 |
| 4,198,080 | 4/1980 | Carpenter | 403/325 X |
| 4,236,395 | 12/1980 | Avaiusini | 70/34 |
| 4,328,687 | 5/1982 | Ritchie | 70/34 |
| 4,361,196 | 11/1982 | Hoyle, Jr. | 403/383 |
| 4,440,005 | 4/1984 | Bulle | 70/14 |
| 4,476,699 | 10/1984 | Dahlborg | 70/34 |
| 4,548,060 | 10/1985 | Campbell | 70/91 |
| 4,563,912 | 1/1986 | Parks | 403/351 X |
| 4,579,476 | 1/1986 | Post | 403/322 |
| 4,617,844 | 10/1986 | Batten | 403/383 |
| 4,637,234 | 1/1987 | Mielonen | 70/34 |
| 4,639,163 | 1/1987 | Buthe et al. | 403/322 |
| 4,643,472 | 2/1987 | Schukei et al. | 403/322 X |
| 4,656,698 | 4/1987 | Arakawa | 24/136 A |
| 4,662,771 | 5/1987 | Roe et al. | 403/322 X |
| 4,711,106 | 12/1987 | Johnson | 70/34 |
| 4,730,468 | 3/1988 | Becker | 70/34 |
| 4,775,269 | 10/1988 | Brix | 403/322 X |
| 4,834,573 | 5/1989 | Asano et al. | 403/383 |
| 4,859,110 | 8/1989 | Dommel | 403/359 X |
| 4,865,485 | 9/1989 | Finnefrock, Sr. | 403/322 |
| 4,893,810 | 1/1990 | Lee | 403/328 X |
| 4,900,182 | 2/1990 | Stillwagon | 403/325 |
| 4,911,573 | 3/1990 | Pietro | 403/349 |
| 4,927,286 | 5/1990 | Hobluigie et al. | 403/325 X |
| 4,966,018 | 10/1990 | Hauber | 70/208 |
| 5,022,243 | 6/1991 | Embry et al. | |
| 5,027,630 | 7/1991 | Stillwagon et al. | |

FOREIGN PATENT DOCUMENTS 196185 2/1958 Austria .............................. 24/115 L Primary Examiner—Peter M. Cuomo
Attorney, Agent, or Firm—Louis T. Isaf

[57] ABSTRACT

A lock and release apparatus comprises an integrally cooperating bar and collar combination which provides a variety of gripping and releasing arrangements; wherein the bar of such combination defines a plurality of circumferentially alternating surfaces, including at least one flat surface and one arcuate surface; and, wherein the collar of such combination defines a ball and cam relationship which cooperates with the arcuate surface of the bar to provide a gripping action between the bar and collar, which is releasable by variety of arrangements made functional by the present invention.

47 Claims, 5 Drawing Sheets

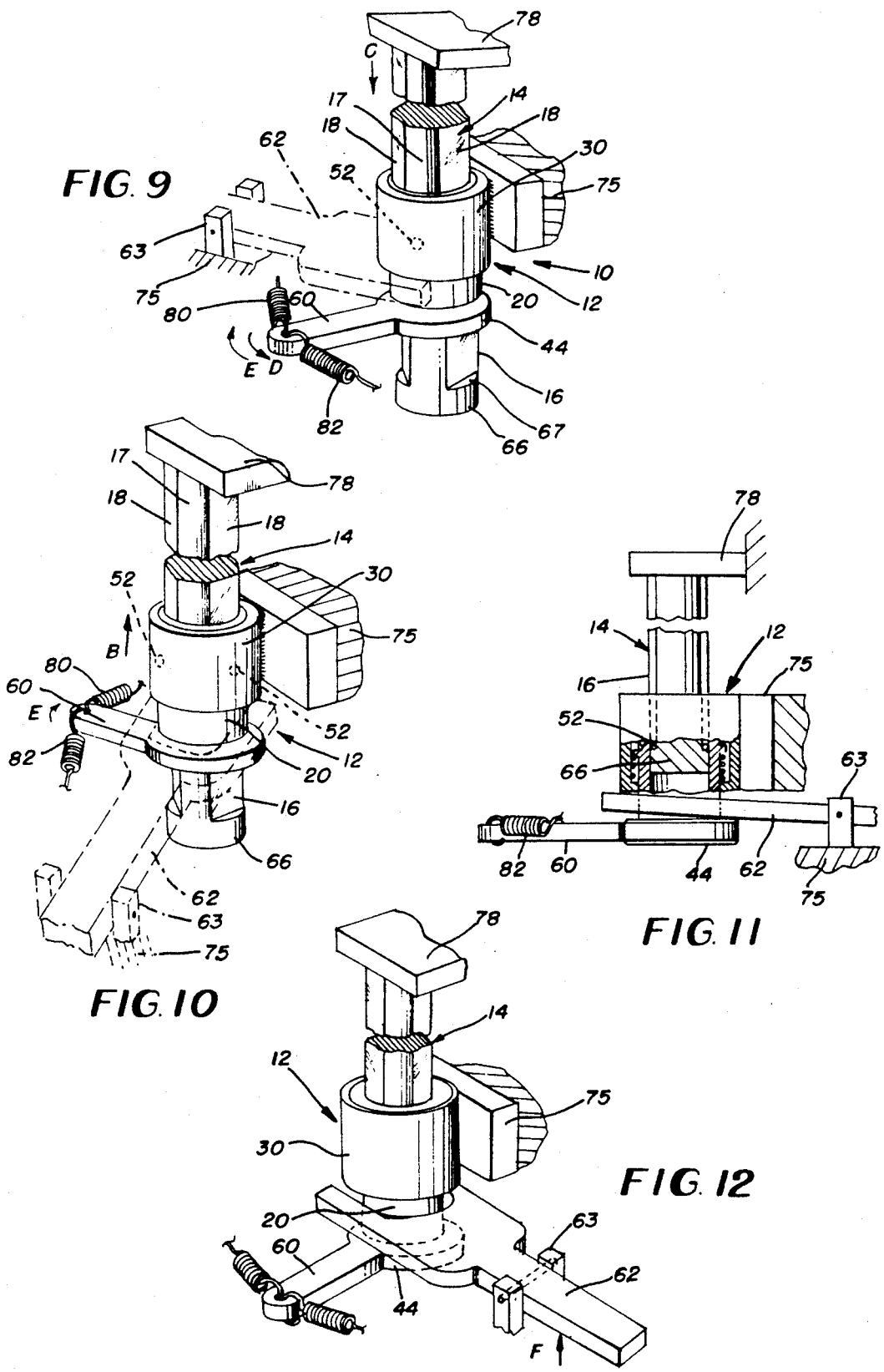

LOCK AND RELEASE APPARATUS

This application is a continuation, of application Ser. No. 07/425,016, filed on Oct. 23, 1989, now abandoned, which is a continuation of application Ser. No. 07/327,250, filed on Mar. 22, 1989, allowed on Aug. 1, 1989, and now U.S. Pat. No. 4,900,182.

FIELD OF THE INVENTION

The present invention relates generally to devices used in the gripping of a bar and more specifically to gripping, locking and quick releasing devices.

BACKGROUND OF THE INVENTION

Known to exist in the relevant industry today are devices which provide one-way, cam locking of a collar on a cylindrical bar. These prior art devices are comprised of a collar apparatus, sometimes referred to as the "quick release collar", for mounting on a cylindrical bar. The quick release collars include, basically, a cylindrical, inner shell with an axial passage for accepting the cylindrical bar and an outer sleeve positioned outside and coaxial with the inner shell, a space being defined between the inner shell and the outer sleeve. The inner shell is defined with a plurality of radial openings and a radially movable ball is located in each of the openings in the shell. A tension ring is rigidly attached to the outer sleeve in the space between the sleeve and the shell. The sleeve and the tension ring are axially slidable with respect to the inner shell between a locked position and an unlocked position. The tension ring has a tapered inner surface portion adjacent to the movable balls. The inner surface portion is tapered to provide a relatively small diameter adjacent to the movable balls in the locked position and a relatively large diameter adjacent to the movable balls in the unlocked position, such that the radial positions of the movable balls depend on the axial position of the tension ring. The spring biases the sleeve and tension ring axially toward the locked position so that the tension ring cams the movable balls inwardly into frictional engagement with the bar. The inner shell and outer sleeve are manually spreadable to move the tension ring axially toward the unlocked position so that the balls move outwardly.

The operation of the prior art, quick release collars is such that, as the collar moves relative to the bar (bar inserted into the collar passage) in a first axial direction, the collar balls and tension ring remain in the unlocked position and the collar moves freely along the bar without locking. However, as the collar moves relative to the bar in the opposite (second) axial direction, the collar balls and tension ring function in the locking position and the collar grips the bar to resist relative movement of the collar and bar. As mentioned above, once the collar has gripped the bar, the "lock" is released by manually spreading the inner shell and outer sleeve to release the frictional engagement between the balls and tension ring.

In the manner generally discussed above, the prior art, quick release collars effect a gripping resistance to relative axial movement between the collar and bar, while providing a quick release of the grip. It is noted that once the grip has been released, the collar may now move freely in the first direction, relative to the bar; but, should the collar be moved again in the second, relative direction, it will again "lock" onto the bar. This one-way axial freedom of movement causes severe limitations in the practical applications of the prior art quick release devices. Furthermore, it is a noted characteristic of the quick release collars that, as the prior art devices are subjected to vibration, while locked onto the bar, the grip becomes tighter-and-tighter as the balls move further-and-further up the tapered cam surface of the tension ring. As the grip becomes tighter, it sometimes becomes extremely difficult to spread the inner shell and outer sleeve to release the collar. Thus, this characteristic, also, creates a limitation to the practical applications for the prior art quick release collars.

SUMMARY OF THE INVENTION

Briefly described, the lock and release apparatus of the present invention comprises an integrally cooperating bar and collar combination. The bar of the present invention comprises a multi-surfaced, elongated bar defining, at least, a segment of alternating arcuate and flat surfaces. That is, as one moves circumferentially about the surface of the bar, one encounters a transition from arcuate surface to flat surface to arcuate surface. In the preferred embodiment, there are a plurality of arcuate surfaces alternately interrupted by a plurality of flat surfaces. Most preferably, there is an equal number of arcuate surfaces and flat surfaces.

In an alternate, preferred embodiment, the bar is comprised of at least two segments of differing circumferential definition. The bar of one such embodiment includes one segment (for example, the upper four-fifths segment of the bar) of alternating arcuate and flat surfaces and a second segment (for example, the lower one-fifth segment of the bar) of completely cylindrical surface. By way of example, and not limitation, the bar of a second such embodiment includes one segment (for example, the upper two-thirds segment of the bar) of alternating arcuate and flat surfaces and a second segment (for example, the lower one-third of the bar) also of alternating arcuate and flat surfaces, but where the flat surfaces of the upper segment are aligned with the arcuate surfaces of the lower segment, and vice-versa.

As used throughout this specification and the appended claims, the term "bar" shall be defined to include both hollow and solid members, it being understood that the replacement of a solid bar with a hollow bar, or a combination thereof, is a matter of design choice allowed within the scope of the present invention.

The collar of the present invention is, preferably, of the quick release collar type known in the prior art and briefly described above. However, the present invention is not to be limited by the known designs of quick release collars. In the preferred embodiment, the collar comprises, at least, a ball and cam relationship which cooperates with the arcuate surfaces of the bar to provide a locking action between the bar and collar. In the preferred embodiment, the number of flat surfaces circumferentially displaced about the bar corresponds to the number of balls in the collar; that is, at least one flat surface for each ball. Less preferred embodiments are contemplated within the scope of the invention wherein the number of flat surfaces and balls do not match-up, in which case the invention is practiced, albeit less effectively.

In preferred embodiments of the present invention, either the collar or the bar or both are provided with handle or lever type elements which assist in accomplishing the release function and, sometimes, the lock functions.

The unique combination of bar and collar in accordance with the present invention provides the capability of a variety of gripping and releasing arrangements which can be utilized individually or in sequence to effect numerous practical mechanisms. At least a few of the variety of gripping and releasing arrangements are as follows: (1) With the balls all aligned with the arcuate surfaces of the bar, the collar "grips" the bar against relative movement, in at least one axial direction; (2) in embodiments with axially tapered cam surfaces on the collar tension ring, the grip is releasable by axial separation of the inner shell and outer sleeve of the collar, provided the "grip" has not become too tight; (3) the grip is releasable by twisting (that is, creating opposite relative angular movement between) the bar and collar about their common axis to align at least one of the balls with a flat surface on the bar to weaken the frictional engagement between the ball and tension ring of the collar; and (4) preferably, upon twisting of the collar and bar, all of the balls are aligned with a flat surface and the collar moves uninhibited in both axial directions along the bar. These and other basic arrangements of gripping and releasing functions are used selectively in the various embodiments to effect the variety of inventive arrangements and applications as will become apparent upon review of the detailed specification hereof.

It is, therefore, an object of the present invention to provide a lock and release apparatus with uniquely cooperating components providing a variety of gripping and releasing arrangements, facilitating a variety of practical applications.

Another object of the present invention is to provide a locking and release apparatus which is easily released, even as the apparatus approaches maximum gripping strength.

Yet another object of the present invention is to provide a bar and collar, lock and release apparatus which facilitates successive locking and releasing operations finding a multitude of practical applications.

Still another object of the present invention is to provide a lock and release apparatus which provides freedom of movement of the collar in both axial directions on a bar while at the same time providing frictional locking in at least one axial direction on the same bar.

Other objects, features and advantages of the present invention will become apparent upon reading and understanding this specification, when taken in conjunction with the accompanying drawings.

BRIEF DESCRIPTION OF THE DRAWINGS

FIG. 9 is a pictorial view of the lock and release apparatus of FIG. 1, showing a practical application thereof, and showing an alternate embodiment of the bar portion, and showing the apparatus in a locked position.

FIG. 10 is a pictorial view of the lock and release apparatus of FIG. 9, and showing the apparatus in the ball-in-flat unlocked position.

FIG. 11 is a side view, with section broken away, of the lock and release apparatus of FIG. 9, showing the apparatus in a second, locked position.

FIG. 12 is a pictorial view of the lock and release apparatus of FIG. 9, showing operation of the axial-pull unlocking function thereof.

DETAILED DESCRIPTION OF THE PREFERRED EMBODIMENTS

Figure 1:
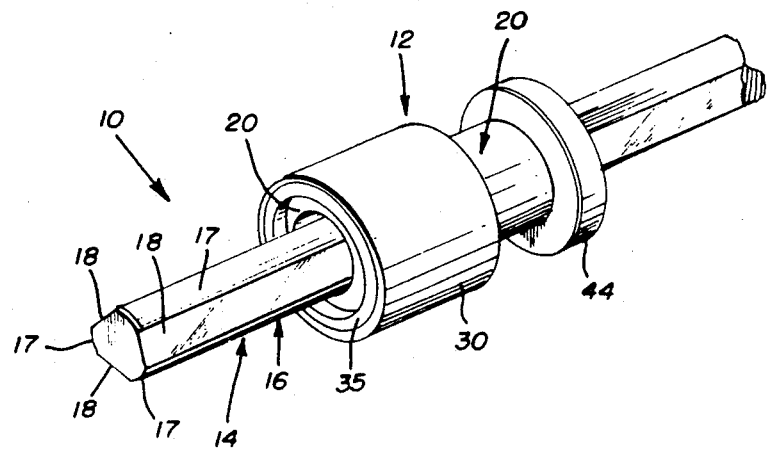
FIG. 1 is an assembled, pictorial view of the lock and release apparatus of the present invention, showing a preferred embodiment thereof.
Figure 2:
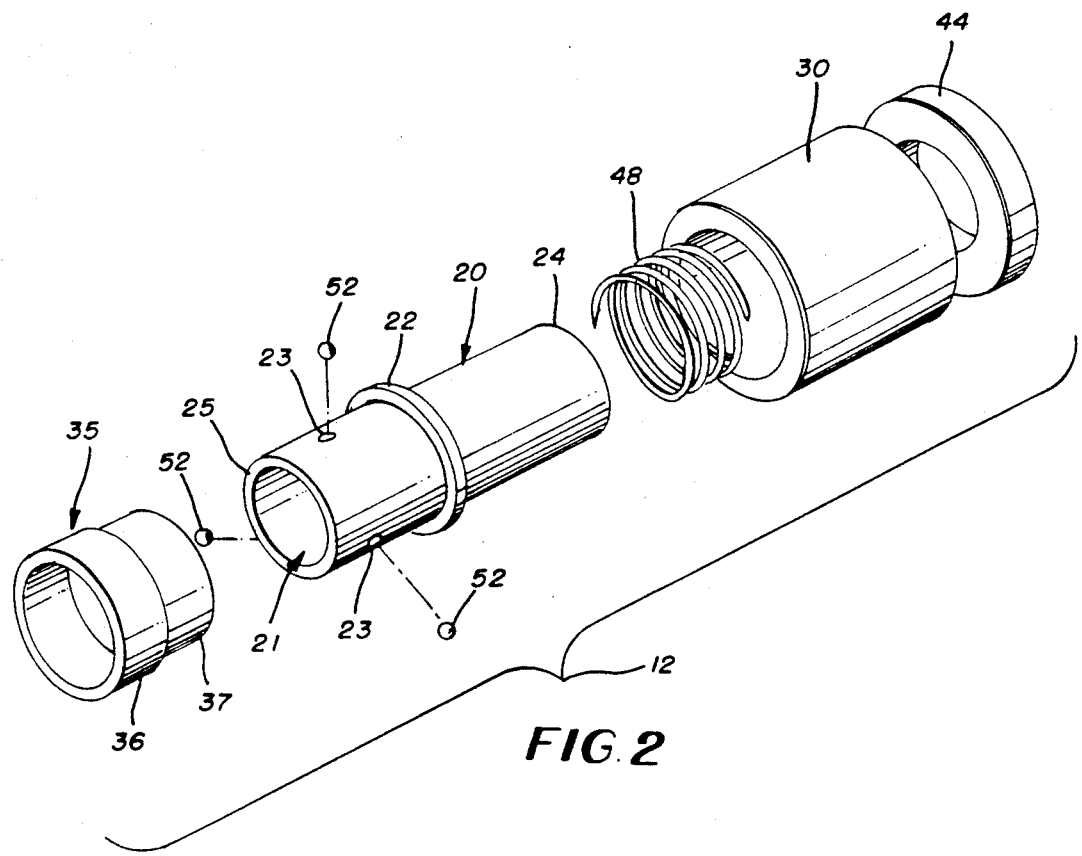
FIG. 2 is an exploded view of the collar portion of the lock and release apparatus of FIG. 1.
Figure 3:
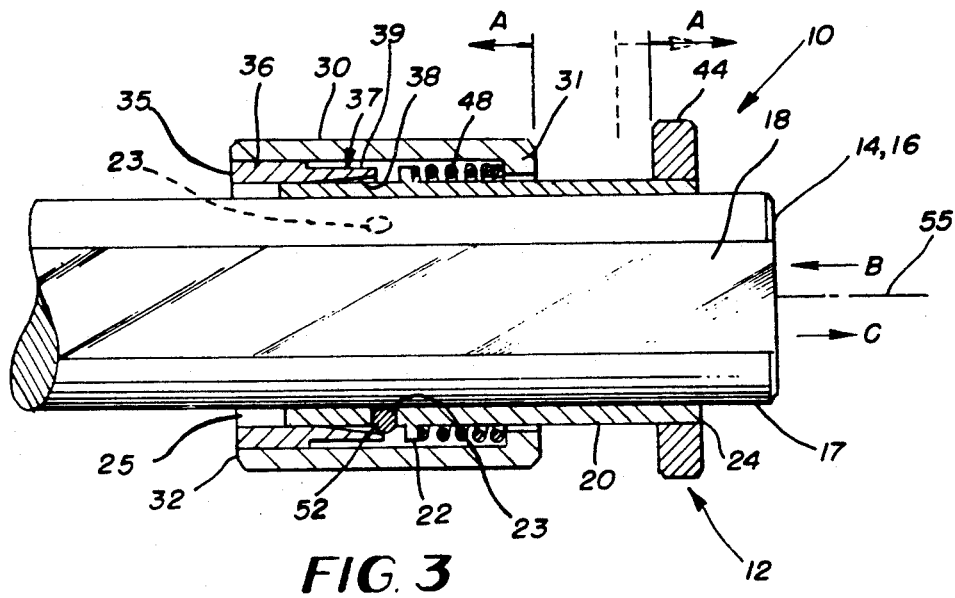
FIG. 3 is a side view of the lock and release apparatus of FIG. 1, showing a preferred embodiment of the collar portion, with an isolated cross-section of the collar portion, and showing the apparatus in the axial-pull unlocking position.

Referring now in greater detail to the drawings in which like numerals represent like components throughout the several views, FIG. 1 depicts a preferred embodiment of the Lock and Release Apparatus 10 of the present invention. The lock and release apparatus 10 is seen as comprising two main portions, the collar portion 12 and the bar portion 14. The bar 14 of the embodiment of FIG. 1 is seen as an elongated, rigid, multi-surface segment 16 of alternating arcuate surfaces 17 and flat surfaces 18. Each of the arcuate surfaces 17 and each of the flat surfaces 18 extends the full length of the observed segment 16 of the bar 14 of FIG. 1. The collar portion 12 of the embodiment of FIG. 1, seen in greater detail in FIGS. 2 & 3, is shown to comprise a cylindrical, inner shell 20, an outer sleeve 30, tension ring 35, gripping ring 44, and biasing spring 48. The inner shell 20 is seen to include a central opening 21 defining an axial passage through the cylindrical shell; and the inner shell also include an outwardly extending annular flange 22 axially displaced from each of the ends 24, 25 of the inner shell. A plurality of radial openings 23 are formed through the shell 20 and a movable ball 52 occupies each of the openings 23. The biasing spring 48 fits over the first (outer) end 24 of the shell 20 and abuts the annular flange 22. The outer sleeve 30 includes a downwardly extending, annular flange 31. The sleeve 30 slides, in coaxial relationship, over the shell 20 from the first end 24, retaining the spring 48 between the two flanges 22, 31 and in the space between the sleeve and shell. The tension ring 35 includes a mounting segment 36 and a cam segment 37; and the tension ring 35 is immovably fixed at its mounting segment 36 to the outer sleeve 30 in the space between the sleeve and inner shell 20 adjacent the inboard end 32 of the sleeve 30. The gripping ring 44 is immovably fixed to the first end 24 of the inner shell 20. The foregoing component arrangement of the collar portion 12 is similar to the quick release collars of the prior art and is not deemed to require further explanation. Component arrangement, operation and/or application of the collar portion 12 which, in accordance with the present invention, requires further explanation will be discussed below.

Figure 8:
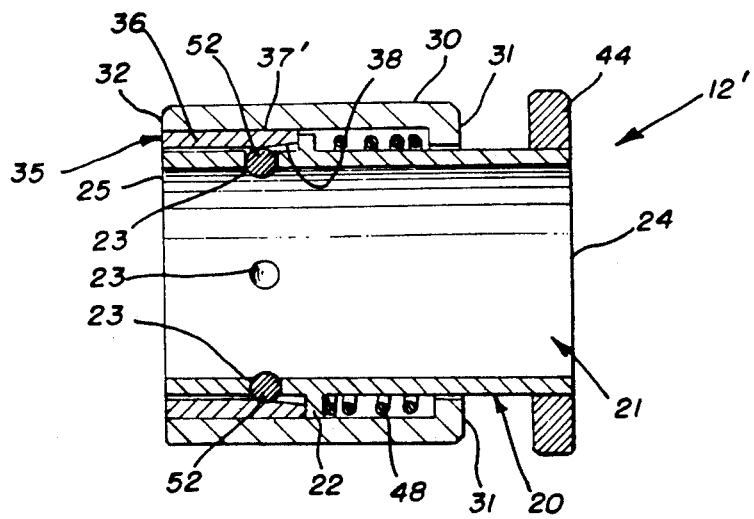
FIG. 8 is a cross-sectional, side view of the collar portion of the lock and release apparatus of FIG. 1, showing an alternate embodiment of the collar portion.
Figure 16:
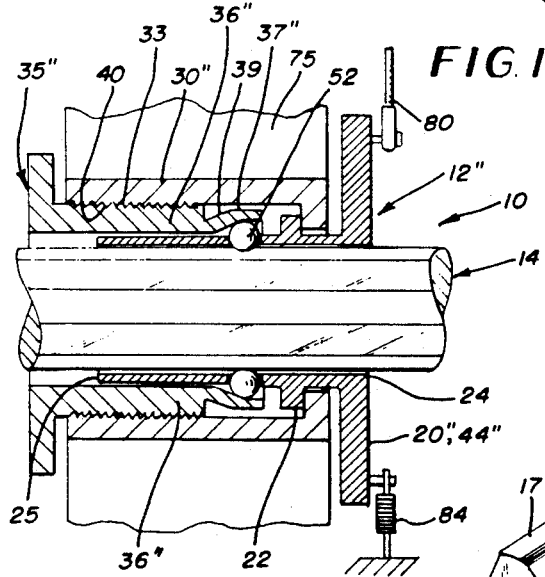
FIG. 16 is a side view of the lock and release apparatus of FIG. 1, showing a second alternate embodiment of the collar portion, with an isolated cross-section of the collar portion.

The tension ring 35, as stated, includes the mounting segments 36 and the cam segment 37. The cam segment 37 is a segment of varied or variable diameter which cooperates with the balls 52 to provide a frictional gripping of the bar under certain conditions, as will be discussed below. The cam segment 37 can take various shapes, some of which produce more preferred results; but all of which are within the scope of the invention. The preferred embodiment of tension ring cam segment 37 is seen in FIG. 3, wherein is shown a cam segment 37 of the tension ring 35 defining a tapered or inclined inner surface 38 adjacent to the movable balls 52 and an under cut surface 39 by which the cam segment is offset from the outer sleeve 30. An alternate embodiment of the cam segment 37' is seen in FIG. 8, where it is seen as defining the tapered inner surface 38 but having no undercut surface; the cam segment, thus, abutting the outer sleeve 30. Another alternate embodiment of the cam segment 37" is seen in FIG. 16, wherein the cam segment includes an undercut surface 39, but no tapered surface. It should be noted that the collar portion 12 of FIG. 3 and the collar portion 12' of FIG. 8 (and only the collar portions) depict prior art quick release collars; the collar portion 12" of FIG. 16 does not depict a prior art quick release collar.

In the preferred embodiments of the present invention, such as represented in FIGS. 1-7, the number of radial openings 23 (and related balls 52) defined in the inner shell 20 correspond to the number flat surfaces 18 on the bar 1, which, preferably, equal the number of arcuate surfaces on the multi-surface bar segment 16. The embodiment of FIGS. 1-3 is seen as using three balls 52 (openings 23) in the collar portion 12. The bar portion 14 of the embodiment of FIGS. 1-3 is seen as including a multi-surface bar segment 16 having three flat surfaces 18 and three arcuate surfaces 17 alternately defined about the circumference of the bar. The angular displacement of the balls 52 about the inner shell 20 corresponds to the angular displacement of the flat surfaces 18 and also to the angular displacement of the arcuate surfaces 17 about the bar. In this way, in preferred embodiments, the bar 14 and collar 12 cooperate such that in one orientation, the "ball-on-arc" position, each ball is adjacent one arcuate surface 17, and in another orientation, the "ball-in-flat" position, each ball is adjacent one flat surface 18. The alternate, preferred embodiment of FIGS. 4-7 show an embodiment in which there are four balls 52 (openings 23), four flat surfaces 18 and four arcuate surfaces 17, all correspondingly, angularly displaced. In alternate embodiments, there are two or more balls 52 (openings 23); and, there are two or more arcuate surfaces 17 and flat surfaces 18 on the multi-surface portion 16 of the bar 14; and, whereas in preferred embodiments there are equal numbers of each, the scope of the invention is not limited thereby.

Figure 17:
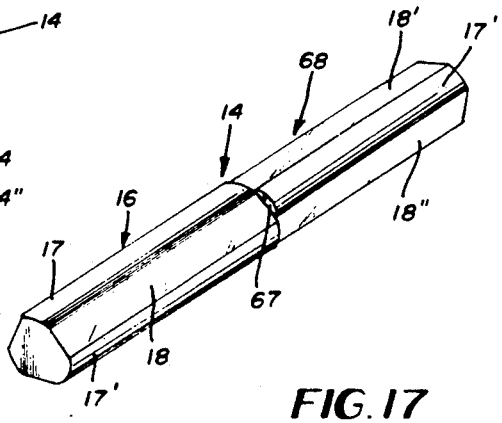
FIG. 17 is a pictorial view of the bar portion of the lock and release apparatus of FIG. 1, showing a second alternate embodiment of the bar portion.

With reference to FIGS. 9-15, preferred embodiments are depicted as comprising a handle 60 or lever 62 or other relative movement creating device 64, or a combination thereof. Also, with reference to FIGS. 9-12, attention is directed to the alternate embodiment depicted therein of the bar portion 14 of the lock and release apparatus 10 of the present invention. In this embodiment, the bar portion comprises two segments: the multi-surface segment 16 described above and mono-surface segment 66 of completely cylindrical circumference. Still another alternate embodiment of the bar portion 14 is shown in FIG. 17, wherein the bar portion 14 comprises two segments: a first multi-surface bar segment 16 and a second, multi-surface bar segment 68. In this embodiment, the flat surfaces 18 of the first segment 16 are in axial alignment with the arcuate surfaces 17' of the second segment 68, and the arcuate surfaces 17 of the first segment 16 are in axial alignment with the flat surfaces 18' of the second segment 68. Preferably, in these alternate embodiments, the transition 67 from flat surface (18, 18') to arcuate surface (66, 17') is slightly tapered.

Figure 4:
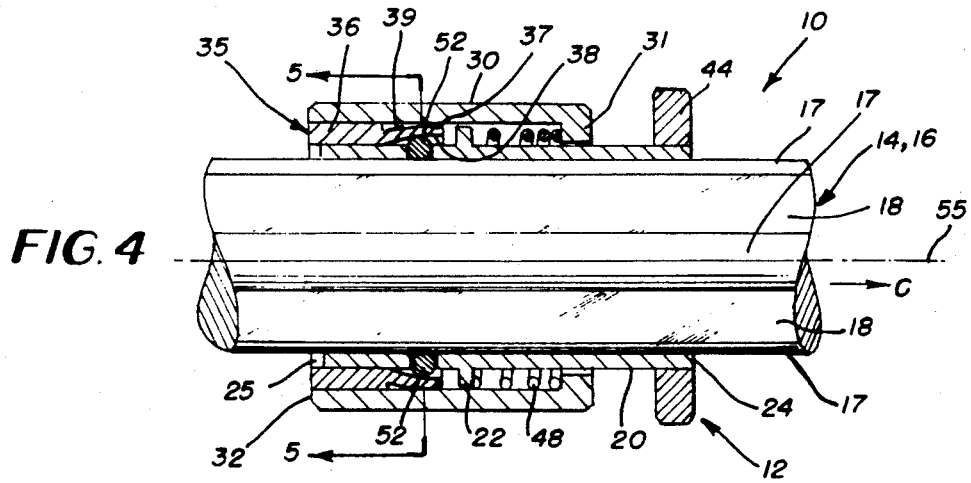
FIG. 4 is a side view of the lock and release apparatus of the present invention, with an isolated cross-section of the collar portion, and showing an alternate embodiment to that of FIG. 1, and showing the apparatus in a locked or locking position.
Figure 5:
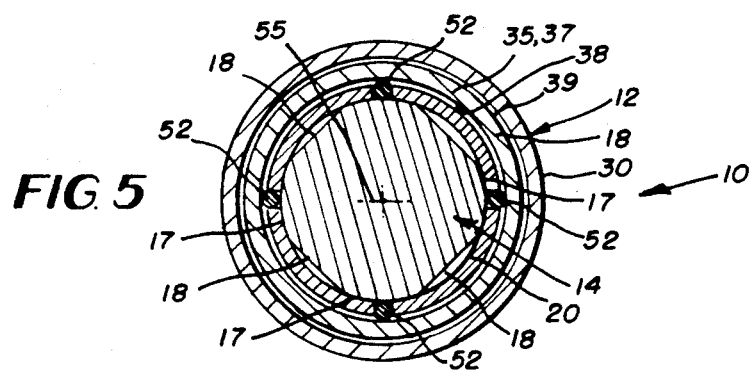
FIG. 5 is an end view of the lock and release apparatus of FIG. 4, taken along line 5—5 of FIG. 4, but without the cross-sectional limitation to the collar portion of FIG. 4.

Operation. As mentioned in the Summary, the unique combination of bar portion 14 and collar portion 12 in accordance with the present invention provides the capability of a variety of gripping and releasing arrangements which can be utilized individually or in sequence to effect numerous practical mechanisms. Some of these gripping and releasing arrangements will be described with reference to the 35 embodiments of FIGS. 3-7. Referring to FIG. 4, the lock and release apparatus 10 of the present invention is seen in a locked or locking position in which the collar portion 12 "grips" the bar portion 14 against relative movement, in at least one axial direction. Thus, for example, in the embodiment of FIG. 4, the bar 14 is movable in the axial direction of arrow "C" relative to the collar portion 12. The locking position is characterized by two main features: (1) the balls 52 are each aligned with an arcuate surface 17 of the bar 14 (also to be referred to as the "ball-on-arc" position); and (2) the balls have each engaged the cam segment 37 of the tension ring 35 enough to push the balls into frictional engagement with the arcuate surfaces 17 (also to be referred to as the "ball-on-cam" position). For embodiments, such as FIG. 3 and FIG. 8, having collar portions 12 with tapered cam segments 37 on the tension ring 35, the gripping action of the locking position will be understood to function as in the prior art. For embodiments, such as FIG. 16, having no tapered cam surface 38 but having an undercut surface 39, the gripping operation is accomplished by spring action of the cantilevered cam 3741, pressing the balls 52 against the arcuate surface 17 of the bar 14.

The action of unlocking or releasing the grip of the collar portion 12 from the bar portion 14 is accomplished by removing one or both of the "ball-on-arc" or the "ball-on-cam" component of the locking position. Again, with reference to FIGS. 3-7, in embodiments with axially tapered cam surfaces 38 on the collar tension ring 35, the ball-on-cam component of the lock is removable by axial separation of the inner shell 20 and outer sleeve 30 of the collar 12, provided the "grip" has not become too tight. This is a release function (also to be referred to as the "axial-pull" release function) familiar to users of the prior art quick release collars. In the axial-pull function, which is represented in FIG. 3, the gripping ring 44 and sleeve 30 are spread apart in opposite axial direction, as represented by arrows "A" of FIG. 3, resulting in the balls 52 being moved to a point on the cam tapered surface 38 of sufficiently great diameter to release the balls from gripping contact with the bar 14. So long as the spreading pressure is maintained, the collar portion 12 and bar portion 14 can move relative to one another in both axial directions (arrows "B" and "C" of FIG. 3).

Figure 6:
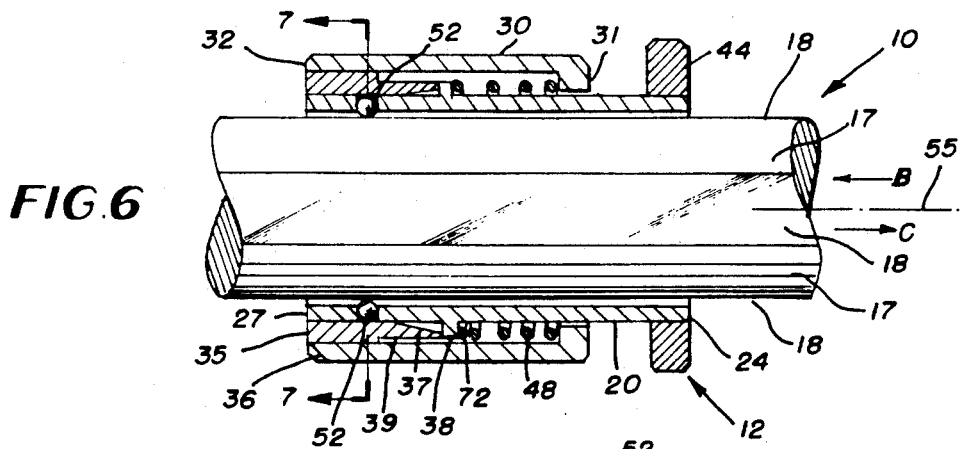
FIG. 6 is a side view of the lock and release apparatus of FIG. 4, with the isolated cross-section of the collar portion, and showing the apparatus in a ball-in-flat unlocked position.
Figure 7:
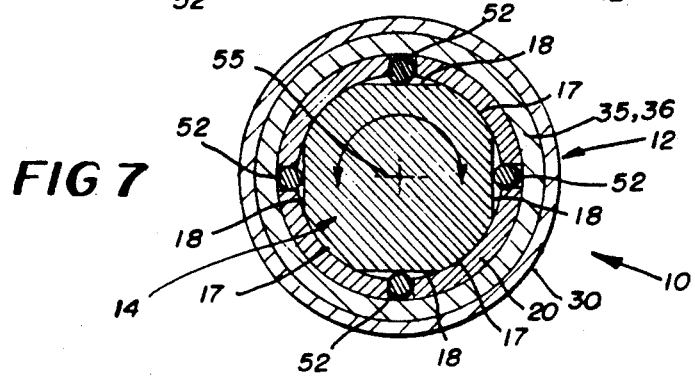
FIG. 7 is an end view of the lock and release apparatus of FIG. 6, taken along line 7—7 of FIG. 6, but without the cross-sectional limitation to the collar portion of FIG. 6.

The ball-on-arc component of the lock position is removable, and thus the locking action is releasable, by twisting (that is, creating opposite relative angular movement between) the bar 14 and collar 12 about their common axis 55 to align each of the balls 52 with a flat surface 18 on the bar. In this release function (also to be referred to as the "angular-twist" release function), which is represented in FIGS. 6 and 7, the radius of the bar 14 is lessened by introduction of the flat surfaces 18 so as to avoid the frictional engagement between the balls 52 and the tension ring 35 of the collar 12. The balls 52 act in the manner of bearings to assist in the relative twisting of the bar 14 and collar 12. In the preferred embodiments of the present invention, upon twisting of the collar 12 and bar 14 in the angular-twist function, all of the balls 52 are aligned with a flat surface 18 and the collar 12 moves uninhibited in both axial directions (arrows "B" and "C" of FIG. 6) along the bar.

In certain embodiments of the present invention, preferably where the cam segment 37 of the tension ring 35 is formed with the undercut surface 39 (see, for example, FIGS. 3 and 16), the spring-like action of the cam segment facilitates both the angular-twist release function of moving the balls 52 into alignment with the flat surfaces 18 and an angular-twist locking function of moving the balls 52 into alignment with the round surfaces 17, while the multi-surface bar segment 16 is still within the collar 12.

In the embodiment of FIG. 16, the mounting segment 36" of the tension ring 35" is seen as including external threading 40, while the outer sleeve 3041 is formed with matching, internal threading 33. The cooperation of the threaded tension ring 35" and sleeve 30" is such that the applied gripping force is variable by selectively screwing the tension ring to varying depths within the sleeve, thus varying the "spring" pressure of the cam 37" on the balls 52. That is, the closer the balls 52 are to the mounting segment 36" of the tension ring 35", the less "spring" action will be exhibited by the cam 37" and the stronger the applied force will be on the balls against the bar 14.

A proper understanding of the locking position (see for example FIGS. 4 and 5) with its ball-on-arc and ball-on-cam components and a proper understanding of the axial-pull release function (see for example FIG. 3) and the angular-twist release function (see for example FIGS. 6 and 7) facilitates the creation of numerous lock and release assemblies which are themselves subjects of the present invention. A few practical, inventive arrangements and applications in accordance with the present invention are provided in FIGS. 9-15, by way of example only and not by way of limitation.

Seen in FIGS. 9-12 is one example embodiment of the lock and release apparatus 10 in a practical, dual-action, lock and release application. In this embodiment, the outer sleeve 30 is rigidly attached to a first body 75 and the bar portion 14 is rigidly attached to a second body 78. The gripping ring 44 is seen as being formed with a handle 60; and a fork-like lever 62 is positioned about the inner shell 20 in the gap between the sleeve 30 and gripping ring 44 as represented in the drawings. The bar 14 of the embodiment of FIGS. 9-12 is one with a first, multi-surface bar segment 16 and a second, fully cylindrical bar segment 66. To assist in envisioning the functioning of this embodiment, the reader is invited to consider this embodiment as depicting the latch and release mechanism for the engine hood of an automobile. Consider the first body 75 to be the car frame at the upper front of the engine compartment; and consider the second body 78 to be the car hood. The gripping ring handle 60 is attached by cable 80 to the hood release lever inside the passenger compartment. The lever 62 is mounted also to the car frame 75 through its fulcrum mount 63. In operation, when the hood 78 is closed, the bar 14 extends into the axial passage 21 of the collar portion 12. As result of spring action 82 (direction of arrow "D") on the handle 60, the inner shell 20 is biased to the position as represented in FIG. 9. The bias positioning takes place, for example, when the hood 78 is up and the bar 14 is out of the collar 12. Thus, it is seen that the lock and release apparatus of FIG. 9 is in the lock position with the balls 52 of the collar 12 aligned with the arcuate surfaces 17 of the bar 14. The collar 12 is of an embodiment such as that in FIG. 3 and, thus, the bar 14 moves freely in the closed-hood direction of arrow "C", but is locked against movement in the open-hood direction.

To open the car hood 78, the driver pulls on the cable 80 from inside the car to, thus, pivot the handle 60 in direction of arrow "E". Since the sleeve 30 is fixed to the car body 75, the inner shell 20 pivots inside the sleeve until, as represented in FIG. 10, the apparatus 10 is in the ball-on-flat position—this being the angular twist release function. The bar 14 is thus released to move in the axial direction of arrow "B". The hood 78 "pops-up" as is typical with car hoods; but the opening movement of the hood is again stopped when the cylindrical, second bar segment 66 comes into frictional locking engagement with the balls 52, as represented by FIG. 11. To overcome this second lock, the driver lifts up on the lever 62 (see arrow "F" of FIG. 12), thus performing the axial-pull release function and lifts on the hood 78 at the same time to open the hood.

The embodiment of FIG. 16 is seen in practical application with the outer sleeve 30" of the collar portion 12" rigidly attached to a first body 75. A pull cable 80 provides a tangential force component (not seen) on the inner shell 20" (and gripping ring 44") to activate the angular-twist release function; and a return spring 84 provides a biasing force to return the inner shell 20" to its original position when the bar 14 is removed.

Figure 13:
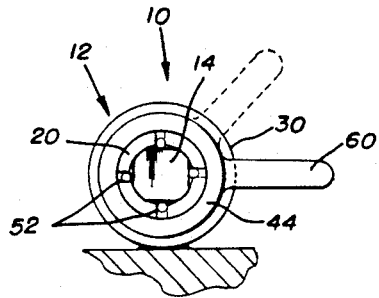
FIG. 13 is a top view of the apparatus of FIG. 9, showing an isolated representation of the locked and ball-in-flat unlocked positions.
Figure 14:
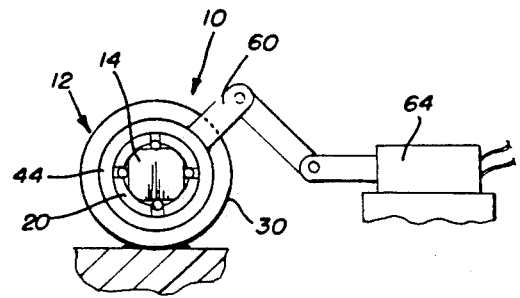
FIG. 14 is a top view representation of the lock and release apparatus of FIG. 1, showing a second practical application thereof.
Figure 15:
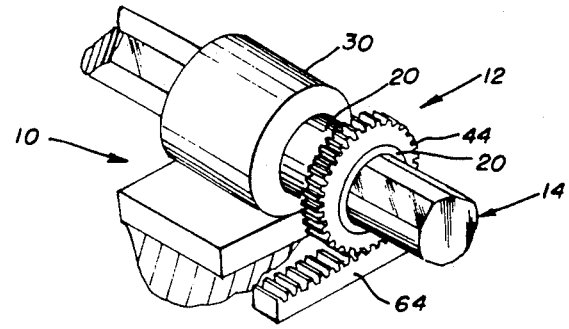
FIG. 15 is a pictorial view of the lock and release apparatus of FIG. 1, showing still a third practical application thereof.

FIGS. 13, 14 and 15 represent, respectively, a manual, electrical, and mechanical activation of the angular-twist release function of the present invention. Review of these representations will suggest numerous applications, including without limitation, door locks for automobiles, glove box latches for automobiles, trunk latches, spare tire retainers, fluid line connectors, locks for vending machines, quick release marine applications, and medical vital fluid connectors.

Whereas the present invention has been described herein in detail with specific reference to preferred embodiments thereof, it will be understood that variations and modifications can be effected within the spirit and scope of the invention as described hereinbefore and as defined in the appended claims.

I claim:

1. A bar and collar apparatus comprising:
   a collar portion including, at least, a cylindrical shell defining an axial passage for receipt of a bar and a protruding means being movably mounted in said cylindrical shell for protrusion into said axial passage; and
   a rigid bar member having a longitudinal axis and including, at least, a first segment including, at least, an axially extending first surface and an axially extending second surface arranged in succession circumferentially about said bar member, said first surface and said second surface extending along said bar member in a direction having at least a directional component which is parallel to said longitudinal axis of said bar member,
   said bar member being insertable into said passage of said collar portion, said collar portion and said bar ember being capable of relative angular movement when said bar member is within said passage at least from a first arrangement defined by said protruding means contacting said first surface to a second arrangement defined by said protruding means contacting said second surface, said protruding means being capable of cooperating with said first surface o said bar member to crate a gripping action, which gripping action prevents relative axial movement between said bar member and said collar portion in at least one axial direction, and said protruding means being capable of cooperating with said second surface of said bar ember to weaken a gripping action created by cooperation between said first surface and said protruding means.

2. Apparatus of claim 1, wherein said cylindrical shell is further defined with at least one radial opening and wherein said protruding means comprises a ball located within said opening, said ball being capable of protruding at least partially into said axial passage.

3. Apparatus of claim 1, wherein said bar member defines a straight bar and further includes, at least, a second segment axially disposed with respect to said first segment, said second segment including, at least, a third surface, said third surface being at least partially aligned with said second surface and being capable of cooperating with said protruding means to create a gripping action, which gripping action prevents relative axial movement between said bar member and said collar portion in at least one axial direction.

4. Apparatus of claim 3, wherein said second segment of said bar member further comprises, at least, a fourth surface arranged circumferentially in succession with said third surface around said bar member, said fourth surface being at least partially aligned with said second surface, and said fourth surface being capable of cooperating with said protruding means to weaken a gripping action created by cooperation between said third surface and said protruding member.

5. Apparatus of claim 4, wherein said third surface is an arcuate surface, defining a surface representing, in profile, an arc of a circle; and said fourth surface is a flat surface, defining a surface representing, in profile, a straight line.

6. Apparatus of claim 1, wherein said protruding means is radially movable relative to said cylindrical shell, and wherein said collar portion further includes, at least, an urging means for selectively urging said protruding means at least partially into said axial passage to a first position.

7. Apparatus of claim 6, wherein said cylindrical shell includes, at least, a radial opening, and wherein said protruding means includes, at least, a ball located at least partially within said radial opening, said ball being capable of protruding at least partially into said axial passage.

8. Apparatus of claim 6, wherein said urging means includes, at least, a tension ring positioned outside and coaxial with said cylindrical shell and being axially slidable with respect to said cylindrical shell, said tension ring being so constructed as to urge said protruding means at least partially into said axial passage to said first position as said tension ring moves in a first axial direction relative to said shell.

9. Apparatus of claim 8, wherein said tension ring is so constructed as to accommodate movement of said protruding means at least partially out of said axial passage to a second position as said tension ring moves in a second axial direction relative to said shell.

10. Apparatus of claim 9, wherein said tension ring defines a tapered inner surface.

11. Apparatus of claim 6, wherein said bar member defines a straight bar, and further includes, at least, a second segment axially disposed with respect to said first segment, said second segment comprising, at least, a third surface, and said third surface being at least partially aligned with said second surface and being capable of cooperating with said protruding means to create a gripping action, which gripping action prevents relative axial movement between said bar member and said collar portion in at least one axial direction.

12. Apparatus of claim 11, wherein said second segment of said bar member further includes, at least, a fourth surface arranged circumferentially in succession with said third surface around said bar member, said fourth surface being at least partially aligned with said second surface, and said fourth surface being capable of cooperating with said protruding means to weaken a gripping action created by cooperation between said third surface and said protruding member.

13. Apparatus of claim 12, wherein said third surface is an arcuate surface, defining a surface representing, in profile, an arc of a circle; and said fourth, surface is a flat surface, defining a surface representing, in profile, a straight line.

14. Apparatus of claim 6, wherein said first surface is an arcuate surface, defining a surface representing, in profile, an arc of a circle; and said second surface is a flat surface, defining a surface representing, in profile, a straight line.

15. Apparatus of claim 1, wherein said first surface is an arcuate surface, defining a surface representing, in profile, an arc of a circle; and said second surface is a flat surface, defining a surface representing, in profile, a straight line.

16. A bar and collar apparatus comprising:
    a collar portion including, at least,
      a cylindrical shell defining an axial passage for receipt of a bar and at least one radial opening;

at least one ball located within said radial opening and movable radially relative to said cylindrical shell; and a tension ring constructed with a tapered inner surface and positioned outside and coaxial with said cylindrical shell and being axially slidable with respect to said cylindrical shell, said tension ring being so constructed and arranged as to urge said ball at least partially into said axial passage to first position as said tension ring moves in a first axial direction relative to said shell, and being so constructed as to accommodate movement of said ball at least partially out of said axial passage to a second position as said tension ring moves in a second axial direction relative to said shell;

a rigid, straight bar member having a longitudinal axis and including, at least, a first segment including, at least, an axially extending arcuate first surface, said first surface defining a surface representing, in profile, an arc of a circle; and an axially extending flat second surface, said second surface defining a surface representing, in profile, a straight line, said surfaces arranged in succession circumferentially about said bar member, said first surface and said second surface extending along said bar member in a direction having at least a directional component which is parallel to said longitudinal axis of said bar member, said bar member being insertable into said passage of said collar portion, said collar portion and said bar member being capable of relative angular movement when said bar member is within said passage, said ball being capable of cooperating with said first surface of said bar member to create a locking action which prohibits relative axial movement between said bar member and said collar portion in at least one axial direction, and said ball being capable of cooperating with said second surface of said bar member to allow relative axial movement between said bar member and said collar portion in both direction.

17. A bar and collar apparatus comprising:

a collar portion including, at least, a cylindrical shell defining an axial passage for receipt of a bar and a protruding means being movably mounted in said cylindrical shell for protrusion into said axial passage; and a rigid bar member having a longitudinal axis and including, at least, a first segment including, at least, an axially extending first surface and an axially extending second surface arranged in succession circumferentially about said bar member, said first surface and said second surface extending along said bar member in a direction having at least a directional component which is parallel to said longitudinal axis of said bar member, said bar member being insertable into said passage of said collar portion, said collar portion and said bar member being capable of relative angular movement when said bar member is within said passage at least from a first arrangement defined by said protruding means contacting said first surface to a second arrangement defined by said protruding means contacting said second surface, said protruding means being capable of cooperating with said first surface of said bar member to create a gripping action which substantially prevents axial movement of said bar member in a first axial direction relative to said collar portion while allowing substantially free axial movement of said bar member in a second axial direction, and said protruding means being capable of cooperating with said second surface of said bar member to allow substantially free axial movement of said bar member relative to said collar portion in both axial directions.

18. A bar and collar apparatus comprising:

a collar portion including, at least, a cylindrical shell defining an axial passage for receipt of a bar, an outer member positioned outside and coaxial with said cylindrical shell, a biasing means for biasing said cylindrical shell in a first direction relative to said outer member, and a protruding means being movably mounted in said cylindrical shell for protrusion into said axial passage in response to movement of said cylindrical shell in the first direction relative to said outer member; and a rigid bar member having a longitudinal axis including, at least, a first segment including, at least, an axially extending first surface and an axially extending second surface arranged in succession circumferentially about said bar member, said first surface and said second surface extending along said bar member in a direction having at least a directional component which is parallel to said longitudinal axis of said bar member, said bar member being insertable into said passage of said collar portion, said collar portion and said bar member being capable of relative angular movement when said bar member is within said passage at least from a first arrangement defined by said protruding means contacting said first surface to a second arrangement defined by said protruding means contacting said second surface, said protruding means being capable of cooperating with said first surface of said bar member to create a gripping action which resists relative axial movement between said bar member and said collar portion in at least one axial direction, and said protruding means being capable of cooperating with said second surface of said bar member to weaken a gripping action created by cooperation between said first surface and said protruding means.

19. A bart and collar apparatus, comprising:

a collar portion including, at least, a cylindrical shell defining an axial passage for receipt of a bar and including, at least, an outwardly extending flange, an outer member positioned outside and coaxial with said cylindrical shell and defining a flange cavity wherein said flange is confined, and a protruding means being movably mounted in said cylindrical shell for protrusion into said axial passage; and a rigid bar member having a longitudinal axis and including, at least, a first segment including, at least, an axially extending first surface and an axially extending second surface arranged in succession circumferentially about said bar member, said first surface and said second surface extending along said bar member in a direction having at least a directional component which is parallel to said longitudinal axis of said bar member, said bar member being insertable into said passage of said collar portion, said collar portion and said bar member being capable of relative angular movement when said bar member is within said passage at least from a first arrangement defined by said protruding means contacting said first surface to a second arrangement defined by said protruding means contacting said second surface, said protruding means being capable of cooperating with said first surface of said bar member to create a gripping action which resists relative axially movement between said bar member and said collar portion in at least one axially direction, and said protruding means being capable of cooperating with said second surface of said bar member to weaken a gripping action created by cooperation between said first surface and said protruding means.

20. A bar and collar apparatus for linking a first body and a second body, said apparatus comprising:
a collar portion for being connected to a first body and including, at least, a cylindrical shell defining an axial passage for receipt of a bar and a protruding means being movably mounted in said cylindrical shell for protrusion into said axial passage; and
a rigid bar member for being connected to a second body and having a longitudinal axis and including, at least, a first segment comprising, at least, an axially extending first surface and an axially extending second surface arranged in succession circumferentially about said bar member, said first surface and said second surface extending along said bar member in a direction having at least a directional component which is parallel to said longitudinal axis of said bar member,
said bar member being insertable into said passage of said collar portion, said collar portion and said bar member being capable of relative angular movement when said bar member is within said passage at least from a first arrangement defined by said protruding means contacting said first surface to a second arrangement defined by said protruding means contacting said second surface, said protruding means being capable of cooperating with said first surface of said bar member to create a gripping action which resists relative axial movement between said bar member and said collar portion in at least one axial direction, and said protruding means being capable of cooperating with said second surface of said bar member to weaken a gripping action created by cooperation between said first surface and said protruding means.

21. A latching apparatus for releasably latching a first element to a second element, said apparatus comprising:
a post member for attachment to a first element;
a collar assembly for attachment to a second element, said
collar assembly comprising
an outer sleeve,
an inner sleeve defining a cylindrical passage for receipt of said post member, and
a detention means for preventing movement of said post member in at least one axial direction relative to said collar assembly, said detention means including a protruding means being movably mounted in said inner sleeve for protrusion into said cylindrical passage;
a first attachment means for connecting said post member to a first element;

a second attachment means for connected said outer sleeve to a second element; and
a first actuator means for changing the positions of said post member and said inner sleeve relative to one another,
said post member having a longitudinal axis and including, at least, a first segment including, at least, an axially extending first surface and an axially extending second surface arranged in succession circumferentially about said post member, said first surface and said second surface extending along said post member in a direction having at least a directional component which is parallel to said longitudinal axis of said post member,
said post member being insertable into said passage of said collar assembly, said collar assembly and said post member being capable of relative angular movement when said post member is within said passage at least from a first arrangement defined by said protruding means contacting said first surface to a second arrangement defined by said protruding means contacting said second surface, said protruding means being capable of cooperating with said first surface of said post member to create a gripping action, which gripping action prevents relative axial movement between said post member and said collar assembly in at least one axial direction, and said protruding means being capable of cooperating with said second surface of said post member to weaken a gripping action created by cooperation between said first surface and said protruding means.

22. Apparatus of claim 21, wherein said actuator means is rigidly attached to said inner sleeve and includes, at least, a lever means for transerring angular force to said inner sleeve.

23. Apparatus of claim 21, wherein said actuator means is rigidly attached to said post member and includes, at least, a gear means for transferring angular force to said post member.

24. Apparatus of claim 21, wherein said first actuator means includes, at least, a means for changing the relative angular positions of said post member and said inner sleeve, and further comprising a second actuator means for changing the relative axial positions of said inner sleeve and said outer sleeve.

25. A bar and collar apparatus comprising:
a collar portion including, at least, a cylindrical shell defining an axial massage for receipt of a bar and a protruding means being movably mounted in said cylindrical shell for protrusion into said axial passage; and
a rigid bar member having a longitudinal axis and including, at least, a first segment including, at least, an axially extending first arcuate surface and an axially extending second flat surface arranged in succession circumferentially about said bar member, said first arcuate surface and said second flat surface extending along said bar member in a direction having at least a directional component which is parallel to said longitudinal axis of said bar member,
said bar member being insertable into said passage of said collar portion, said collar portion and said bar member being capable of relative angular movement when said bar member is within said passage, said protruding means being capable of cooperating with said first arcuate surface of said bar member to create a gripping action, which gripping action prevents relative axial movement between said bar member and said collar portion in at least one axial direction, and said protruding means being capable of cooperating with said second flat surface of said bar member to weaken a gripping action created by cooperation between said first arcuate surface and said protruding means.

26. Apparatus of claim 25, wherein said cylindrical shell is further defined with at least one radial opening and wherein said protruding means comprises a ball located within said opening, said ball being capable of protruding at least partially into said axial passage.

27. Apparatus of claim 25, wherein said bar member defines a straight bar and further includes, at least, a second segment axially disposed with respect to said first segment, said second segment including, at least, a third arcuate surface, said third arcuate surface being at least partially aligned with said second flat surface and being capable of cooperating with said protruding means to create a gripping action, which gripping action prevents relative axial movement between said bar member and said collar portion in at least one axial direction.

28. Apparatus of claim 27, wherein said second segment of said bar member further comprises, at least, a fourth flat surface arranged circumferentially in succession with said third arcuate surface around said bar member, said fourth flat surface being at least partially aligned with said second flat surface, and said fourth flat surface being capable of cooperating with said protruding means to weaken a gripping action created by cooperation between said third arcuate surface and said protruding member.

29. Apparatus of claim 28, wherein said third arcuate surface defines a surface representing, in profile, an arc of a circle; and said fourth flat surface defines a surface representing, in profile, a straight line.

30. Apparatus of claim 25, wherein said protruding means is radially movable relative to said cylindrical shell, and wherein said collar portion further includes, at least, an urging means for selectively urging said protruding means at least partially into said axial passage to a first position.

31. Apparatus of claim 30, wherein said cylindrical shell includes, at least, a radial opening, and wherein said protruding means includes, at least, a ball located at least partially within said radial opening, said ball being capable of protruding at least partially into said axial passage.

32. Apparatus of claim 30, wherein said urging means includes, at least, a tension ring positioned outside and coaxial with said cylindrical shell and being axially slidable with respect to said cylindrical shell, said tension ring being so constructed as to urge said protruding means at least partially into said axial passage to said first position as said tension ring moves in a first axial direction relative to said shell.

33. Apparatus of claim 32, wherein said tension ring is so constructed as to accommodate movement of said protruding means at least partially out of said axial passage to a second position as said tension ring moves in a second axial direction relative to said shell.

34. Apparatus of claim 33, wherein said tension ring defines a tapered inner surface.

35. Apparatus of claim 30, wherein said bar member defines a straight bar, and further includes, at least, a second segment axially disposed with respect to said first segment, said second segment comprising, at least, a third arcuate surface, and said third arcuate surface being at least partially aligned with said second flat surface and being capable of cooperating with said protruding means to create a gripping action, which gripping action prevents relative axial movement between said bar member and said collar portion in at least one axial direction.

36. Apparatus of claim 35, wherein said second segment of said bar member further includes, at least, a fourth flat surface arranged circumferentially in succession with said third arcuate surface around said bar member, said fourth flat surface being at least partially aligned with said second flat surface, and said fourth flat surface being capable of cooperating with said protruding means to weaken a gripping action created by cooperation between said third arcuate surface and said protruding member.

37. Apparatus of claim 36, wherein said third arcuate surface defines a surface representing, in profile, an arc of a circle; and said fourth flat surface defines a surface representing, in profile, a straight line.

38. Apparatus of claim 30, wherein said first arcuate surface defines a surface representing, in profile, an arc of a circle; and said second flat surface defines a surface representing, in profile, a straight line.

39. Apparatus of claim 25, wherein said first arcuate surface defines a surface representing, in profile, an arc of a circle; and said second flat surface defines a surface representing, in profile, a straight line.

40. A bar and collar apparatus comprising:
a collar portion including, at least, a cylindrical shell defining an axial passage for receipt of a bar and a protruding means being movably mounted in said cylindrical shell for protrusion into said axial passage; and
a rigid bar member having a longitudinal axis and including, at least, a first segment including, at least, an axially extending first arcuate surface and an axially extending second flat surface arranged in succession circumferentially about said bar member, said first arcuate surface and said second flat surface extending along said bar member in a direction having at least a directional component which is parallel to said longitudinal axis of said bar member,
said bar member being insertable into said passage of said collar portion, said collar portion and said bar member being capable of relative angular movement when said bar member is within said passage, said protruding means being capable of cooperating with said first arcuate surface of said bar member to create a gripping action which substantially prevents axial movement of said bar member in a first axial direction relative to said collar portion while allowing substantially free axial movement of said bar member in a second axial direction, and said protruding means being capable of cooperating with said second flat surface of said bar member to allow substantially free axial movement of said bar member relative to said collar portion in both axial directions.

41. A bar and collar apparatus comprising:
a collar portion including, at least,
a cylindrical shell defining an axial passage for receipt of a bar,
an outer member positioned outside and coaxial with said cylindrical shell, a biasing means for biasing said cylindrical shell in a first direction relative to said outer member, and a protruding means being movably mounted in said cylindrical shell for protrusion into said axial passage in response to movement of said cylindrical shell in the first direction relative to said outer member; and a rigid bar member having a longitudinal axis and including, at least, a first segment including, at least, an axially extending first arcuate surface and an axially extending second flat surface arranged in succession circumferentially about said bar member, said first arcuate surface and said second flat surface extending along said bar member in a direction having at least a directional component which is parallel to said longitudinal axis of said bar member, said bar member being insertable into said passage of said collar portion, said collar portion and said bar member being capable of relative angular movement when said bar member is within said passage, said protruding means being capable of cooperating with said first arcuate surface of said bar member to create a gripping action which resists relative axial movement between said bar member and said collar portion in at least one axial direction, and said protruding means being capable of cooperating with said second flat surface of said bar member to weaken a gripping action created by cooperation between said first arcuate surface and said protruding means.

42. A bar and collar apparatus, comprising:
a collar portion including, at last,
a cylindrical shell defining an axial passage for receipt of a bar and including, at least. an outwardly extending flange,
an outer member positioned outside and coaxial with said cylindrical shell and defining a flange cavity wherein said flange is confined, and
a protruding means being movably mounted in said cylindrical shell for protrusion into said axial passage; and
a rigid bar member having a longitudinal axis and including, at least, a first segment including, at least, an axially extending first arcuate surface and an axially extending second flat surface arranged in succession circumferentially about said bar member, said first arcuate surface and said second flat surface extending along said bar member in a direction having at least a directional component which is parallel to said longitudinal axis of said bar member,
said bar member being insertable into said passage of said collar portion, said collar portion and said bar member being capable of relative angular movement when said bar member is within said passage, said protruding means being capable of cooperating with said first arcuate surface of said bar member to create a gripping action which resists relative axial movement between said bar member and said collar portion in at least one axial direction, and said protruding means being capable of cooperating with said second flat surface of said bar member to weaken a gripping action created by cooperation between said first arcuate surface and said protruding means.

43. A bar and collar apparatus for linking a first body and a second body, said apparatus comprising:
a collar portion for being connected to a first body an including, at least, a cylindrical shell defining an axial passage for receipt of a bar and protruding means being movably mounted in said cylindrical shell for protrusion into said axial passage; and
a rigid bar member for being connected to a second body and having a longitudinal axis and including, at least, a first segment comprising, at least, an axially extending first arcuate surface and an axially extending second flat surface arranged in succession circumferentially about said bar member, said first arcuate surface and said second flat surface extending along said bar member in a direction having at least a directional component which is parallel to said longitudinal axis of said bar member,
said bar member being insertable into said passage of said collar portion, said collar portion and said bar member being capable of relative angular movement when said bar member is within said passage, said protruding means being capable of cooperating with said first arcuate surface of said bar member to create a gripping action which resists relative axial movement between said bar member and said collar portion in at least one axial direction, and said protruding means being capable of cooperating with said second flat surface of said bar member to weaken a gripping action created by cooperation between said first arcuate surface and said protruding means.

44. A latching apparatus for releasably latching a first element to a second element, said apparatus comprising:
a post member for attachment to a first element;
a collar assembly for attachment to a second element, said collar assembly comprising
an outer sleeve,
an inner sleeve defining a cylindrical passage for receipt of said post member, and
a detention means for preventing movement of said post member in at least one axial direction relative to said collar assembly, said detection means including a protruding means being movably mounted in said inner sleeve for protrusion into said cylindrical passage;
a first attachment means for connecting said post member to a first element; and
a second attachment means for connected said outer sleeve to a second element; and
an first actuator means for changing the positions of said post member and said inner sleeve relative to one another,
said post member having a longitudinal axis and including, at least, a first segment including, at least, an axially extending first arcuate surface and an axially extending second flat surface arranged in succession circumferentially about said post member
said first arcuate surface and said second flat surface extending along said post member in a direction having at least a directional component which is parallel to said longitudinal axis of said post member,
said post member being insertable into said passage of said collar assembly, said collar assembly and said post member being capable of relative angular movement when said post member is within said passage, said protruding means being capable of cooperating with said first arcuate surface of said post member to create a griping action, which gripping action prevents relative axial movement between said post member and said collar assembly in at least one axial direction, and said protruding means being capable of cooperating with said second flat surface of said post member to weaken a gripping action created by cooperation between said first arcuate surface and said protruding means.

45. Apparatus of claim 44, wherein said actuator means is rigidly attached to said inner sleeve and includes, at least, a lever means for transferring angular force to said inner sleeve.

46. Apparatus of claim 44, wherein said actuator means is rigidly attached to said post member and includes, at least, a gear means for transferring angular force to said post member.

47. Apparatus of claim 44, wherein said first actuator means includes, at least, a means for changing the relative angular positions of said post member and said inner sleeve, and further comprising a second actuator means for changing the relative axial positions of said inner sleeve and said outer sleeve.

* * * * *